United States Patent [19]
Higgs et al.

[11] Patent Number: 5,880,177
[45] Date of Patent: Mar. 9, 1999

[54] PARTICULATE MATERIALS

[75] Inventors: Robert Philip Higgs, St. Austell; Deeba Marjan Ansari, Truro, both of United Kingdom

[73] Assignee: ECC International Ltd., United Kingdom

[21] Appl. No.: 867,106

[22] Filed: Jun. 2, 1997

[30] Foreign Application Priority Data

Jun. 5, 1996 [GB] United Kingdom .................... 9611701

[51] Int. Cl.$^6$ ...................................................... C08K 9/00
[52] U.S. Cl. ............................................. 523/217; 523/216
[58] Field of Search ...................................... 523/217, 335

[56] References Cited

U.S. PATENT DOCUMENTS

| | | | |
|---|---|---|---|
| 4,746,543 | 5/1988 | Zinkan | 524/502 |
| 4,803,231 | 2/1989 | Seinera et al. | 523/219 |
| 4,925,586 | 5/1990 | Baker | 252/90 |
| 5,362,413 | 11/1994 | Kaufmann | 252/174 |
| 5,364,729 | 11/1994 | Lawrynowicz | 523/335 |
| 5,366,841 | 11/1994 | Patel | 523/335 |
| 5,370,964 | 12/1994 | Patel | 523/335 |
| 5,403,693 | 4/1995 | Patel | 523/335 |

FOREIGN PATENT DOCUMENTS

| | | |
|---|---|---|
| 0681155A | 11/1995 | European Pat. Off. . |
| 1527995 | 10/1978 | United Kingdom . |
| 1574969 | 9/1980 | United Kingdom . |
| 2132992 | 7/1984 | United Kingdom . |
| WO95/17441 | 6/1995 | WIPO . |

*Primary Examiner*—Paul R. Michl
*Attorney, Agent, or Firm*—Suzanne Kikel

[57] ABSTRACT

A method of preparing an inorganic particulate material suitable for incorporation in a composition comprising a hydrophobic polymeric material includes the steps of (a) processing an aqueous suspension of an inorganic particulate material in the presence of a water soluble dispersing agent; (b) adding a surfactant to the particulate material; and (c) drying the particulate material. The inorganic particulate material to which the surfactant has been added may be further treated by addition thereto of a further surface treatment agent which is a hydrophobising surface treatment agent, eg. a carboxylic acid or salt thereof. The surfactant may be a non-ionic surfactant and may be added to the particulate material whilst in the form of a dispersed aqueous suspension. The further surface treatment agent may be added to the particulate material during or after the drying step (c).

5 Claims, No Drawings

PARTICULATE MATERIALS

The present invention relates to particulate materials. In particular, it relates to an improved surface treated inorganic material for use in hydrophobic polymeric compositions and the preparation and use of such material.

It is common to incorporate an inorganic particulate filler material into a polymeric material. For example, such fillers when added to thermoplastic compositions may improve the stiffness, rigidity and impact resistance of the composition, especially when the composition is to be used to produce moulded articles which may for example be used as components for automobiles or casings for domestic appliances. In recent years there has been an increasing trend to make casings for domestic appliances, such as vacuum cleaners, food processors and lawn mowers, and many components of automobiles, especially interior fittings, and many other products of plastics or polymeric based materials rather than of metallic materials. Initially these components were made of acrylonitrile-butadiene-styrene (ABS) copolymers or other polymer blends of the engineering plastics type, but these materials are expensive. Materials which are attractive for this purpose on account of their relatively low price are polyolefins. However, polyolefin compositions generally suffer from the problem of having low stiffness and low impact resistance, and it has been found necessary to add a mineral filler material to a polyolefin composition in order to improve the mechanical properties to an acceptable level.

A suitable inorganic filler material may be prepared for example by feeding a concentrated aqueous suspension containing at least 50% by weight and usually from about 70% to 80% by weight of a particulate solid material, for example calcium carbonate, and a dispersing agent for the particulate solid material, into a hot gas-swept attrition grinding mill of the type described in EP-A-0681155. A surface treatment agent, for example stearic acid or a stearate, may also be added to the particulate solid material in the grinding mill, so that the particulate solid material is at the same time dried and treated with the treatment agent. The surface treatment agent hydrophobises the particulate material to assist subsequent processing especially when the material is incorporated into a hydrophobic polymer material such as a thermoplastic material. The resultant product following treatment in the said mill contains less than about 0.3% by weight of water and is virtually free of aggregates or agglomerates. However, when the surface treated particulate material is incorporated into a thermoplastic composition containing, for example, a polyolefin, such as polypropylene, or poly(vinyl chloride), the particulate material tends to aggregate or agglomerate, with the result that it is difficult to disperse into the thermoplastic material, and, when it is incorporated, gives a filled thermoplastic material of inferior mechanical properties, such as impact strength and toughness, and inferior surface gloss. The aggregation or agglomeration of particulate material with or without a surface treatment in thermoplastic material is described for example by J. W. Ess and P. R. Hornsby in Plastics and Rubber Processing and Applications, 8 (1987), pages 147–156.

A particulate filler material is usually dispersed in a thermoplastic composition by a process of melt compounding in, for example, a twin screw compounder. The thermoplastic material is introduced, generally in granular form, at the feed end of the compounder, and the filler may be added either in powder form at a point intermediate between the feed and discharge ends of the compounder, or, in the form of a premix of the filler with a small quantity of the thermoplastic material, at the feed end of the compounder together with the bulk of the thermoplastic material. The problem of the aggregation or agglomeration of a particulate filler which has been prepared with the aid of a water soluble dispersing agent in the presence of a thermoplastic material may be overcome to some extent by increasing the amount of energy applied to the compounding apparatus, but clearly this is not an attractive expedient for economic reasons, and even with the expenditure of considerable amounts of additional energy, the properties of the filled thermoplastic material are still inferior to those obtained with the use of a filler which has not been prepared with the aid of a water soluble dispersing agent. Similar problems are obtained when a filler prepared using a water soluble dispersing agent is incorporated into other hydrophobic or oleophilic polymeric compositions.

Fillers free of water soluble dispersing agents may be prepared, for example, by a process of dry grinding the raw filler material followed by an air classification step. However, it is difficult to produce economically a filler having the desired particle size distribution by this route. Alternatively, the filler material may be wet ground in the absence of a dispersing agent. However, in this case, it is possible to perform the grinding operation only at a relatively low solids concentration, and the suspension of the ground filler material must be concentrated, generally with the consumption of thermal energy, before the filler material can be transported economically.

The purpose of the present invention is therefore to provide an improved particulate material and a method for producing the same, wherein the particles of the particulate material have been processed in an aqueous medium using a water soluble dispersing agent and wherein the particles are to be subsequently treated to render them suitable for use in a composition comprising a hydrophobic polymeric material.

According to the present invention in a first aspect there is provided a method of preparing an inorganic particulate material suitable for incorporation in a composition comprising a hydrophobic polymeric material which method includes the steps of (a) processing an aqueous suspension of an inorganic particulate material in the presence of a water soluble dispersing agent; (b) adding a surfactant to the particulate material; and (c) drying the particulate material.

The surfactant may conveniently be added to the particulate material whilst the particulate material is in the form of the said aqueous suspension before drying although it may alternatively be added during or after the drying step (c).

The surfactant comprises a molecule having hydrophilic and hydrophobic (organophilic) moeities and addition of the surfactant to the dispersing agent treated particulate material causes bonding of the surfactant molecules to the dispersing agent treated particles. We have found unexpectedly that the particles of the particulate material following steps (b) and (c) may by the addition of the surfactant be rendered attractive to a hydrophobising surface treatment agent, the extent of the attraction depending on the type of particulate material, the amount and type of water soluble dispersing agent present and the amount and type of surfactant added.

The particles of the particulate material treated as in steps (a), (b) and (c) may be hydrophobised by a further step (d), viz the addition of a hydrophobising surface treatment agent. Such a hydrophobising agent, where employed, preferably follows the addition of the surfactant (step (b)). The said hydrophobising surface treatment agent may be added during or after the drying step (c).

The hydrophobising surface treatment agent added in step (d) may be one of the hydrophobising surface treatment agents known in the prior art. For example, the surface treatment agent may be selected from one or more of anionic surface treatment agents, eg. carboxylic acids having from 3 to 20 carbon atoms in their hydrocarbon chain such as butyric, lauric, oleic and stearic acid, or their salts, organosilane coupling agents, organotitanates and zircoaluminates. The preferred surface treatment agents are stearic acid and its salts.

The surfactant may be a non-ionic surfactant which, generally speaking, may be any of the known non-ionic surfactants. For example, the non-ionic surfactant may be a water soluble, non-ionic surfactant comprising one or more compounds selected from primary, secondary and tertiary alcohol ethoxylates, alkyl phenols, ethoxylated dialkyl phenols, block copolymers comprising alkylene oxides, alkylphenoxypolyethoxyalkanols and polyoxyethylated acetylenic glycols. Alcohol ethoxylates are preferred for use as the non-ionic surfactant. Preferably, the surfactant if non-ionic has a hydrophile/lipophile balance (HLB) in the range 5 to 14, eg. in the range 8 to 11.

Examples of suitable commercially available non-ionic surfactants are the products sold respectively under the trade names TRITON X-100, DOBANOL 91-6 and NEODOL 91-6.

Preferably, the surfactant is present together with the inorganic particulate material in an amount of up to 1%, especially up to 0.5% by weight, eg. from 0.01% to 0.2% by weight, based on the dry weight of the inorganic particulate material.

Although the scope of the invention is not to be construed as being limited to any particular bonding mechanism theory, we believe that the following mechanism applies, namely that the surfactant molecules attach by hydrogen bonding to the dispersing agent molecules already adhered ionically to the inorganic particles and that the molecules of the hydrophobising agent become attached to the surfactant molecules by similar hydrogen bonding. The dispersing agent—surfactant chains thereby provide favourable bonding sites for attachment of the hydrophobising surface treatment agent thereby effectively and efficiently hydrophobising the dispersing agent treated inorganic particulate material.

We have found surprisingly and beneficially that particulate inorganic material may, using the method according to the first aspect, be produced in a form which is more suitable for dispersion in hydrophobic or oleophilic media, especially polymeric materials, than prior art materials of the kind produced using a water soluble dispersing agent. For example, aggregates and agglomerates obtained in the prior art when such materials are dispersed in the hydrophobic polymeric material may be avoided or minimized and this allows, for example, the gloss and in some cases the mechanical properties, eg. impact resistance, of a filled thermoplastic material made by incorporation of such inorganic particulate material advantageously to be improved.

The step in which the aqueous suspension of the particulate material is processed, ie. step (a) may comprise one or more comminution steps, eg. one or more grinding steps possibly together with one or more wet product classification procedures, eg. centrifugation. Such steps per se are well known in the minerals processing art.

For example, the communition step(s) where employed may comprise grinding using an attrition grinding medium eg. as described in Applicants' EP614948A. The grinding medium may comprise one of the hard, inorganic materials well known in the grinding of particulate materials. For example, silica sand having a median particle diameter in the range from about 0.1 mm to 4 mm, eg. 0.2 mm to 2 mm, is a preferred grinding medium. The grinding medium could alternatively be aluminum oxide, zirconium oxide, zirconium silicate, aluminium silicate, hard steel or a mixture of any of these materials. The energy dissipated in the grinding process may be at least 100 kilowatt hours per dry tonne of particulate material ground.

The dispersing agent may be present in the processing step (a), eg. comminution by grinding, to facilitate use of high solids concentrations during such processing. The dispersing agent serves to prevent flocculation of the particles of the particulate material during processing at high solids concentrations.

In this specification "high solids concentrations" means concentrations of an aqueous suspension in which the solids present on a dry weight basis form at least 50 per cent, desirably at least 60 per cent, by weight of the suspension. Generally, processing of inorganic particulate material at lower solids concentrations, ie. lower than 50 per cent by weight solids, does not essentially require use of a dispersing agent.

After such processing, the particulate material may be dried in one of a number of known ways, eg. by thermal evaporation. Desirably, the particulate material is dried to such an extent that the material contains less than 0.5%, preferably less than 0.3% by weight, water. The particulate material may be further treated during drying, eg. so as to be autogenously ground. This may be carried out in a known way, eg. in a hot gas swept attrition grinding mill, eg. as described in EP681,155A.

A preferred form of the method according to the first aspect of the present invention is as follows. An aqueous suspension of the particulate material together with a dispersing agent (for the particulate material in the aqueous suspension) is first obtained, eg. as the product of previous wet processing steps. Preferably, the suspension contains at least 60% by weight (on a dry weight basis) of particulate material. Non-ionic surfactant is then added to the suspension. The surfactant-treated suspension is then fed into a drying apparatus which may also serve as a grinding mill, eg. a hot gas swept attrition grinding mill of the type described in EP-A-0681155A, and the hydrophobising surface treatment agent is added to the particulate material whilst in the drying apparatus. The product of this process is a substantially dry, ie. containing no more than about 0.3% by weight of water, surface treated particulate material, which is almost completely free of aggregates or agglomerates.

An alternative form of the method according to the first aspect is as follows. Non-ionic surfactant is added to a concentrated suspension of particulate material containing dispersing agent and the suspension is dried as for the preferred form of the method. A substantially dry inorganic particulate material, which has been prepared by drying such an aqueous suspension containing the particulate material, the dispersing agent and the surfactant, is mixed with the hydrophobising surface treatment agent in a substantially dry state in a high energy mill operating at a temperature of at least 75° C.

According to the present invention in a second aspect there is provided an inorganic particulate material suitable for incorporating in a hydrophobic polymeric material and comprising, in substantially dry form, the product of the method according to the first aspect, the particulate material having a surface treatment composition bonded thereto, the surface treatment composition comprising a dispersing agent of the type employed for dispersing the particulate material in an aqueous suspension, a non-ionic surfactant, and a hydrophobising surface treatment agent. The relative amounts of the dispersing agent, surfactant and surface treatment agent present may be as described hereinafter.

The particulate material according to the second aspect may comprise an inorganic particulate material selected from known pigment, filler, extender and property modifier materials conventionally employed as additives in compositions comprising hydrophobic or oleophilic compositions. For example, the inorganic particulate material may comprise calcium carbonate, kaolinitic clay, calcined kaolinitic clay, mica, talc, aluminium silicate, including natural aluminium silicates such as feldspar and nepheline syenite, calcium silicate, including natural calcium silicates such as wollastonite, bauxite, alumina trihydrate, dolomite, a carbonate or hydroxide of magnesium, calcium sulphate, titanium dioxide, or a mixture of any two or more of these. Most advantageously the particulate material comprises a calcium carbonate containing material, which may be prepared either synthetically by chemical precipitation or by grinding a natural calcium carbonate containing mineral, eg. marble, chalk, limestone or dolomite, or it may be a blend of precipitated and ground materials.

In general, the particle size distribution of the inorganic particulate material according to the second aspect will depend upon application of the hydrophobic polymeric material to be filled with the inorganic material. Desirably, for most applications, the inorganic particulate material according to the second aspect comprises inorganic particles at least 80%, preferably at least 90%, of which have an equivalent spherical diameter (esd) (diameter of a sphere which falls at the same rate as measured by sedimentation) of less than 2 microns (micrometres). For high gloss, high impact filled thermoplastic materials applications, eg. for household uses, the inorganic particulate material preferably comprises predominantly calcium carbonate at least 50% of which by weight has an esd less than 0.5 microns.

For more general purpose applications, eg. filling of adhesives, sealants and the like, the particulate material desirably comprises particles at least 50% of which by weight have an esd less than 1 micron.

The said dispersing agent employed for processing of the particulate material in the form of an aqueous suspension is preferably an anionic polyelectrolyte, and most preferably a polycarboxylate, such as, for example, a partially or wholly neutralised water soluble salt of a poly(acrylic acid) and/or of a poly(methacrylic acid), the polycarboxylate preferably having a weight average molecular weight in the range of from about 1,000 to 20,000.

In the material according to the second aspect of the present invention, the dispersing agent may be present in an amount which is between 0.01% and 2.0%, especially 0.5% to 1.0%, of the dry weight of the particulate material. The surfactant may be present in amounts of up to 1%, eg. up to 0.5% by weight, especially from 0.01% to 0.2% by weight, based on the dry weight of inorganic particulate material present. The surface treatment agent may be present in an amount of up to 5% by weight, eg. from 0.5% to 5% by weight, especially from 2% to 3% by weight, based on the dry weight of the inorganic particulate material present.

According to the present invention in a third aspect there is provided a method of producing a composition comprising a hydrophobic or oleophilic polymeric material which includes incorporating in the composition, together with the polymeric material, particulate material according to the second aspect.

According to the present invention in a fourth aspect there is provided a modified polymeric material which is a product of the method according to the third aspect.

The polymeric material in the third and fourth aspects of the present invention may be of any of the kinds of hydrophobic or oleophilic (substantially water insoluble) polymeric materials in which inorganic particulate materials are known to be incorporated, eg. as pigment, filler, extender, property modifying, reinforcing or coating materials. Such material may comprise for example a continuous polymer matrix when the filler is added therein or thereto, eg. a shaped article. Such material may comprise a thermoplastic material, a thermosetting material, a cold setting material or a non-water based resin or resinous composition. Such materials may be employed in a variety of well known applications, eg. as moulded plastics products, elastomers, rubbers, sealants, adhesives, varnishes, paints and the like. The particulate material may be added to the polymeric material to be distributed throughout the bulk thereof in a known manner. Alternatively, it may be added to the polymeric material in only a region thereof, eg. on a surface of the material, eg. where the material comprises a body to be coated.

In the method according to the third aspect, the particulate material according to the second aspect may be incorporated directly into or added to a body of a polymeric material to form a product by one of the suitable product forming processes well known in the art. Alternatively, the particulate material may be formed together with thermoplastic or thermoplastic forming material into an intermediate product, eg. as described in U.S. Pat. No. 4,803,231 or WO 95/17441, such as in a granular or pellet form, which may subsequently be added to a polymeric, eg. thermoplastic, material for the formation of a product. Any of the polymeric materials described in U.S. Pat. No. 4,803,231 or WO 95/17441 may be employed for this purpose. In particular, the particulate material may be formed into an intermediate product together with polyolefin materials, eg. an amorphous or wax material, such as a polypropylene or a polypropylene/polyethylene co-polymer. Other known agents, eg. lubricant, may be included in the intermediate product formation.

Examples of thermoplastic materials into which particulate material according to the second aspect may be incorporated with or without the formation of an intermediate product include polyolefin homopolymers or copolymers (eg. low density or high density polyethylenes, linear polyethylenes, polypropylenes, ethylene-propylene copolymers, ethylene(vinyl acetate) copolymers, and ethylene-(acrylic acid) copolymers, halogenated polyethylenes (such as chlorinated polyethylene), polybutene, polymethylbutene, polyisobutylene, polystyrenes and polystyrene derivatives (eg. SB, ABS, SA and SBS rubbers), PVCs, polycarbonates, polysulphones, polyether sulphones, PEEK, saturated polyesters (eg. polyethylene terephthalates and/or polybutylene terephthalates), and polyphenylene oxides and blends, mixtures or copolymers containing these species.

We have found that the material according to the second aspect is especially suitable for incorporation into polypropylene homo- or co-polymers.

As noted above, where the material according to the fourth aspect comprises a thermoplastic material the product-forming process employed to form a product from the thermoplastic material and the particulate filler material added thereto either as a powder or in the form of a granular or pelletised intermediate product as referred to above may be one of the methods well known in the art. Examples include melt compounding followed by extrusion of films, tubes, shapes, strips and coatings onto other materials, eg. paper, metal sheet, foil, injection moulding, blow moulding, casting and thermoforming. The melt compounding may for example be carried out in a suitable compounder or screw extruder. The thermoplastic material to be compounded may suitable be in a granular or pelletised form. The temperature of the compounding and moulding, shaping or extrusion processes will depend upon the thermoplastic material being processed and materials incorporated therein. The temperature will be above the softening point of the thermoplastic material. Where the polymeric material comprises a non-thermoplastic material, eg. thermosetting or cold setting resin, it may be processed with incorporation of material according to the second aspect in a known way.

The material according to the fourth aspect may include up to 80% by weight, in particular from 1% up to 50% by weight, eg. from 10% to 40% by weight, of the particulate material according to the second aspect, the amount depending upon the materials involved and the application of the product.

The material according to the fourth aspect may include other additives well known to those familiar in the art, eg. processing agents, such as lubricants, thermal or photochemical stabilising agents, colouring agents, plasticisers, antistatic agents, fire retardants, anti-oxidants, metal passivating agents or other reinforcing or filling agents such as natural or artificial fibres, metal particles, strands or foils, glass beads or microspheres and the like or other mineral (inorganic) fillers.

It may be formed into products either alone or together with other materials such as plastics, metals, refractories, wood, paper etc. in the form of laminates, coatings and the like.

Embodiments of the present invention will now be described by way of example only with reference to the following Examples.

EXAMPLE 1

A suspension was prepared containing 78% by weight of a natural marble, which had been comminuted to give a product having a particle size distribution such that 90% by weight consisted of particles having an equivalent spherical diameter smaller than 2 $\mu$m, and 0.7% by weight, based on the weight of dry marble, of a sodium polyacrylate dispersing agent. There was then added to this suspension 0.03% by weight, based on the dry weight of marble, of a nonionic surfactant of the octylphenol ethoxylate type which is marketed under the trade name "TRITON X-100". The surfactant was thoroughly mixed into the suspension to form mixed suspension A. A second suspension B of finely ground marble was prepared exactly as described above, except that no surfactant was added to this suspension.

Each suspension was then introduced into a hot gas swept attrition grinding mill of the type described in EP-A-0681155 and was dried in the mill to a water content of not more than 0.3% by weight and to the form of a fine, substantially aggregate-free powder. The product powder from each suspension A and B was divided into two portions. Each portion was then surface treated with stearic acid by mixing the dry powder with solid stearic acid in a Steele and Cowlishaw mixer at a temperature of 80° C. and a rotor speed of 3000 rpm for a time of 10–15 minutes. Portions A1 and B1 were treated with 1.5% by weight, based on the dry weight of inorganic particulate material present of stearic acid, and Portions A2 and B2 were treated with 2.5% by weight, based on the dry weight of inorganic particulate material present, of stearic acid. The portions of surface treated particulate material were then incorporated into polypropylene compositions in the proportions of 40% by weight of particulate material and 60% by weight of polypropylene granules. In each case the polypropylene material used was a homopolymer produced by Imperial Chemical Industries plc under the trade name "GWE 27". The compositions were compounded in a Baker Perkins MP2030 twin screw compounder which was electrically heated to give a die temperature of 210° C. The resultant product formed by compounding was injection moulded in an Arburg 320M injection moulding machine using a nozzle temperature of 230° C. and a mould temperature of 60° C. to form a number of standard test specimens for the following tests.

Notched impact strength was measured by means of a procedure in which a weighted pendulum was allowed to swing through a fixed distance on to the notched edge of a standard specimen notched to a depth of 2 mm with sufficient momentum to break the specimen. The speed at which the pendulum hit the specimen was in each case 3.46 m.s$^{-1}$. The energy absorbed per unit area of the specimen was recorded in KJ.m$^{-2}$. The unnotched or reversed impact strength was measured by a similar procedure in which the pendulum was allowed to contact the unnotched edge of the specimen. These procedures are in accordance with ISO Standard No. 180.

Falling weight or multiaxial impact energy was determined by means of a Rosand falling weight impact tester in which a 25 Kg weight having a 20 mm hemispherical tup was allowed to fall through a height such that the speed of the tup on impact was 4.4 m.s$^{-1}$ on to a square test sample of side 80 mm and thickness 2 mm supported on a ring of internal diameter 45 mm. A transducer monitored the vertical deflection of the centre of the disc with time after contact with the falling weight and the energy in joules absorbed before rupture occurred was calculated. This procedure is in accordance with ISO Standard No. 6603-2.

Gloss was measured by means of a Gardner Haze-gloss meter set at angles of 60° and 20°, respectively, to the normal to the plane of the test specimen. The results were expressed as a percentage of the incident light which was reflected at the selected angle with the normal. This procedure is in accordance with ISO Standard No. 2813.

The results are set forth in Table 1 below.

TABLE 1

| Portion | % by wt. of stearic acid | Gloss (%) at 20° | Gloss (%) at 60° | Impact Strength Multiaxial (J · mm$^{-1}$) | Impact Strength IZOD Notched (kJ · m$^{-2}$) | Impact Strength IZOD Unnotched (kJ · m$^{-2}$) |
|---|---|---|---|---|---|---|
| A1 (invention) | 1.5 | 62 | 76 | 3 | 1.6 | 18 |
| B1 (comparative) | 1.5 | 54 | 71 | 3 | 1.8 | 20 |
| A2 (invention) | 2.5 | 70 | 81 | 8 | 2.9 | 47 |
| B2 (comparative) | 2.5 | 66 | 78 | 7 | 2.7 | 32 |

These results show that the treatment of the filler material with a non-ionic surfactant prior to the treatment with stearic acid gives a filled polypropylene composition having a superior surface gloss as compared with a polypropylene composition which was filled with a material which had not been treated with a surfactant. Also, in the case of the filler material which had been treated with 2.5% by weight of stearic acid, based on the dry weight of filler, the impact strength was found to be higher in the case of the filler which had first been treated with the surfactant.

EXAMPLE 2

A further suspension was prepared as in Example 1 containing 78% by weight of the same comminuted natural marble which was described in Example 1 above. There was added to this suspension 0.03% by weight, based on the weight of dry marble, of the same nonionic surfactant as was used in Example 1. The surfactant was thoroughly mixed into the suspension to form mixed suspension "A". A second suspension "B" of finely ground marble was prepared exactly as described above, except that no surfactant was added to this suspension.

Each suspension was then introduced into a hot gas swept attrition grinding mill of the type described in EP-A-0681155 and was dried in the mill to a water content of not more than 0.3% by weight and to the form of a fine, substantially aggregate-free powder. At the same time there was introduced into the mill 2.4% by weight of stearic acid, based on the weight of dry marble. The surface treated filler from each suspension A and B was then incorporated into polypropylene compositions in the proportions of 40% by weight of filler and 60% by weight of polypropylene granules. In each case the polypropylene used was the same as that used in Example 1. The compositions were compounded in a Werner and Pfleiderer ZSK40 compounder and the resultant compound was injection moulded in an Arburg 320M injection moulding machine at a nozzle temperature of 230° to form standard test specimens for the multiaxial, notched and unnotched impact tests described in Example 1 above.

The results are set forth in Table 2 below.

TABLE 2

| | Impact strength | | |
|---|---|---|---|
| Suspension | Multiaxial (J · mm$^{-1}$) | IZOD Notched (kJ · m$^{-2}$) | IZOD Unnotched (kJ · m$^{-2}$) |
| A (invention) | 9 | 3.6 | 67 |
| B (comparative) | 4 | 2.7 | 32 |

The treatment of the suspension of comminuted calcium carbonate with the non-ionic surfactant prior to the surface treatment with stearic acid effected a significant improvement in the impact strength measured by each of the three tests.

EXAMPLE 3

A suspension was prepared containing 75% by weight of a natural marble, which had been comminuted to give a product having a particle size distribution such that 90% by weight consisted of particles having an equivalent spherical diameter smaller than 1 μm, and 0.7% by weight, based on the weight of dry marble, of a sodium polyacrylate dispersing agent.

The suspension was divided into three portions A, B, and C. No surfactant was added to Portion A, and there were added to Portions B and C, respectively, 0.1% by weight of the same surfactant as was described in Example 1 (Surfactant i), and 0.03% by weight of a nonionic surfactant of the ethoxylated alcohol type marketed by Shell Chemicals Limited under the trade name "DOBANOL 91-6" (Surfactant ii). In each case the percentages by weight were based on the weight of dry marble.

Each portion of suspension was then introduced into a hot gas swept attrition grinding mill of the type described in EP-A-0681155 and was dried in the mill to a water content of not more than 0.3% by weight and to the form of a fine, substantially aggregate-free powder. At the same time there was introduced into the mill 3.0% by weight of stearic acid, based on the weight of dry marble. The surface treated particulate material from each suspension A, B and C was then incorporated into polypropylene compositions in the proportions of 40% by weight of filler and 60% by weight of polypropylene granules. In each case the polypropylene material used was the same as that used in Example 1. The compositions were compounded in a Werner and Pfleiderer ZSK40 compounder and the resultant compound was injection moulded in an Arburg 320M injection moulding machine at a nozzle temperature of 230° to form standard test specimens for the multiaxial, notched and unnotched impact tests and for the surface gloss measurements described in Example 1 above.

The results are set forth in Table 3 below.

TABLE 3

| | Surfactant | | Gloss | | Impact Strength | |
|---|---|---|---|---|---|---|
| Portion | Type | % by wt. | (%) at 20° | 60° | IZOD Multiaxial (J · mm$^{-1}$) | IZOD Notched (kJ · m$^{-2}$) | IZOD Unnotched (kJ · m$^{-2}$) |
| A | — | 0 | 72 | 86 | 3 | 5.2 | 29 |
| B | i | 0.1 | 76 | 89 | 5 | 5.2 | 38 |
| C | ii | 0.03 | 75 | 88 | 5 | 5.1 | 32 |

Table 3 shows an improvement in gloss and impact strength for Portions B and C wherein non-ionic surfactant was added to the suspension prior to drying compared with Portion A wherein no surfactant was added.

EXAMPLE 4

Calcium carbonate slurry was produced by wet grinding a suspension of natural marble in a known way. The slurry had the following properties. Solids content: 75% by weight; dispersing agent: 0.7% by weight (based on the dry weight of calcium carbonate) of sodium polyacrylate; percentage of particles having an esd less than 2 μm:90%; percentage of particles having an esd less than 1 μm:65%.

To a first batch of the slurry there was added 0.06% by weight (based on the dry weight of solids present) of the non-ionic surfactant sold under the trade designation Neodol 91-6, which is a primary alcohol ethoxylate having a mean of 6 moles of ethylene oxide per mole of alcohol. A second batch of the slurry was not treated with surfactant. Both batches of slurry were dried in a hot gas swept attrition grinding mill of the kind described in EP681,155A operating at 500 kW. Whilst the slurry in both cases was being dried, stearic acid was added to give a hydrophobised surface treatment of the calcium carbonate particles, the amount of stearic acid present on the dry particles being 2.5% by weight. The dried, surface treated calcium carbonate produced in each case was separately formed into a thermoplastic composition by mixture with polypropylene homopolymer in a twin screw compounder, the polypropylene and the compounder being as employed in Example 1, the weight ratio of calcium carbonate:polypropylene being 40:60.

After drying overnight at a temperature of 60° C., the two thermoplastic compositions produced were injection moulded as in Example 1. Gloss and impact properties of the product samples so produced were measured as in Example 1. The results obtained are given in Table 4 as follows, wherein Sample 1 indicates the thermoplastic composition produced by the procedure wherein non-ionic surfactant was added to the calcium carbonate slurry and Sample 2 is the composition produced when no non-ionic surfactant was added.

TABLE 4

| Sample | Gloss % at | | Multiaxial Impact data Fail energy | Impact Strength | |
|---|---|---|---|---|---|
| | 20° | 60° | J/mm | IZOD kJ · m$^2$ | Reverse IZOD kJ · m$^2$ |
| 1 | 60 | 78 | 10 | 5.1 | 50 |
| 2 | 58 | 77 | 7 | 4.7 | 43 |

As can be seen from Table 4, the gloss was slightly improved and the impact strength properties were significantly improved by use in the preparation of Sample 1 of non-ionic surfactant to treat the calcium carbonate slurry prior to drying compared with Sample 2 in which no non-ionic surfactant was used.

We claim:

1. A method of preparing an inorganic particulate material suitable for incorporation in a composition comprising a hydrophobic polymeric material which method includes the steps of (a) processing an aqueous suspension of an inorganic particulate material selected from calcium carbonate, kaolinitic clay, calcined kaolinitic clay, mica, talc, aluminum silicate, calcium silicate, alumina trihydrate, dolomite, bauxite, magnesium carbonate, magnesium hydroxide, calcium sulfate, titanium dioxide and mixtures thereof, in the presence of a water soluble anionic polyelectrolyte dispersing agent which serves to disperse the inorganic particulate material in the suspension; (b) adding a non-ionic surfactant to the particulate material in an amount which does not exceed about 1% by weight based on the dry weight of the inorganic particulate material; (c) drying the particulate material; and (d) during or after the drying step (c), treating the inorganic particulate material to which the surfactant has been added by addition thereto of a further surface treatment agent which is an anionic hydrophobising surface treatment agent.

2. A method as claimed in claim 1 and wherein the processing of the aqueous suspension in step (a) includes one or more comminution steps.

3. A method as claimed in claim 1 and wherein the aqueous suspension during processing in step (a) contains at least 50 percent by dry weight of solids.

4. A method as claimed in claim 1 and wherein the inorganic particulate material is dried in step (c) to such an extent that the material contains less than 0.5% by weight water.

5. A method as claimed in claim 1 and wherein the surfactant is added to the particulate material whilst the particulate material is in the form of an aqueous suspension prior to the drying step (c).

* * * * *